US005727094A

United States Patent [19]

Kitagaki

[11] Patent Number: 5,727,094

[45] Date of Patent: Mar. 10, 1998

[54] METHOD AND SYSTEM FOR PROCESSING IMAGES CAPABLE OF TRANSITION OF A PLURALITY OF STATES FOR DISPLAY

[75] Inventor: Kazukuni Kitagaki, Kawasaki, Japan

[73] Assignee: Kabushiki Kaisha Toshiba, Kawasaki, Japan

[21] Appl. No.: 404,568

[22] Filed: Mar. 15, 1995

[30] Foreign Application Priority Data

Mar. 15, 1994 [JP] Japan .................................... 6-044189

[51] Int. Cl.$^{6}$ .............................. G06K 9/20; G06K 9/36; G09G 5/14; G09G 5/00

[52] U.S. Cl. ........................... 382/282; 345/120; 345/118

[58] Field of Search .............................. 345/11, 114, 119, 345/120, 118, 214; 382/282, 283, 270

[56] References Cited

U.S. PATENT DOCUMENTS

| | | | |
|---|---|---|---|
| 4,649,377 | 3/1987 | Urabe | 345/118 |
| 4,780,709 | 10/1988 | Randall | 345/120 |
| 5,450,553 | 9/1995 | Kitagaki et al. | 395/800 |

FOREIGN PATENT DOCUMENTS

| | | |
|---|---|---|
| 3 282782 | 12/1991 | Japan . |

*Primary Examiner*—Leo Boudreau
*Assistant Examiner*—Wenpeng Chen
*Attorney, Agent, or Firm*—Oblon, Spivak, McClelland, Maier & Neustadt, P.C.

[57] ABSTRACT

The image processing method for determining an inside or outside of the rectangular region (window) on the basis of counted values of the first and second raster scanning counters, comprises a step of dividing the entire screen by a region which is encircled by an outer peripheral and straight lines extended from each sides of a rectangular region separated in the sub scanning direction, a step of performing a state transition corresponding to the present scanning position, a step of determining a state to be changed by the counted value of the second counter when both ends in the main scanning direction coincides with both ends of the screen, a step of determining a state to be changed by the counted value of the first counter when an end portion in the main scanning direction does not coincide with an end of the screen, and a step of determining a state to be changed by the counted value of the second counter when an end portion in the main scanning direction does not coincide with an end of the screen and when a starting end does not coincide with an end of the screen, thereby providing a method and system for an image processing capable of determining any of image of inside or outside in the rectangular region with a small circuit scale.

8 Claims, 10 Drawing Sheets

METHOD AND SYSTEM FOR PROCESSING IMAGES CAPABLE OF TRANSITION OF A PLURALITY OF STATES FOR DISPLAY

BACKGROUND OF THE INVENTION

The present invention relates to a method and system for processing images which are positioned by two-dimensional numerical data, and more specifically to, a method and system for processing images, which are capable of displaying a plurality of different display states (windows) in one screen, and capable of transition of these display states.

Recently, image processing have been performed in various technical field such as an industry, citizen life and the like. In these image processing, a certain image processing once performs different processing inside and outside of a rectangular region. In this case, there is frequently used a processing with a raster scanning. In addition, it is necessary to determine as to whether the present processed position is inside or outside of the rectangular region in the above processing.

There is described a conventional method of determining as to whether the processing is performed in inside or outside of the rectangular region as follows:

At first, there is described, as a simple example, a case where a screen 50 is divided into two regions with reference to FIG. 1. Accordingly, a screen shown in FIG. 1 includes a rectangular region 51, a coordinate ($x_0$, $y_0$) in an upper left corner of the rectangular region 51, and a coordinate ($x_1$, $y_1$) in a lower right corner of the rectangular region 51. A coordinate (x, y) of a present scanning position is calculated by an X-direction counter and a Y-direction counter which are called as a raster scan counter. The X-direction counter is treated (increased) by an increment at each scanned pixel, and reset by a pixel at a right end in the screen. The Y-direction counter is treated (increased) by an increment at each right pixel of a scanned line in the screen, and reset by a pixel at a lower right end in the screen.

Now, two processed states (hereafter simply called as states) are allotted at an inside and outside of the rectangular region 51, in which the inside of the rectangular region is a state $S_1$ and the outside is a state $S_2$. A state transition is performed, as shown in FIG. 2, under the condition that the state $S_2$ is supposed as an initial state.

Accordingly, in the state $S_2$, when entire conditions of "$x_0<x$", "$x\leqq x_1$", "$y_0<y$" and "$y\leqq y_1$" are established, the state $S_2$ changes to the state $S_1$. When the entire conditions are not established, the state $S_2$ remains. In the state $S_1$ when the condition of "$x>x_1$" is established, the state $S_1$ changes to the state $S_2$. When other conditions are included, the state $S_1$ remains.

Since the conventional method has four conditional equations to be compared at one time, it is necessary to provide four comparators for comparing values in the raster scan counter with the coordinates $x_0$ and $x_1$ or $y_0$ and $y_1$ in the rectangular region.

Next, there will be described an example in the case of a plurality of rectangular regions. As shown in FIG. 3, the example is supposed by first and second rectangular regions 51 and 52 which are not interposed on each other. A coordinate in the upper left corner of the first rectangular region 51 is set to ($x_0$, $y_0$), a coordinate in the lower right corner of the first rectangular region 51 is set to ($x_1$, $y_1$), a coordinate in the upper left corner of the second rectangular region 52 is set to ($x_2$, $y_2$), and a coordinate in the lower right corner of the second rectangular region 52 is set to ($x_3$, $y_3$).

When an inside of the first rectangular region 51 is set as a state $S_2$, when an inside of the second rectangular region 52 is set as a state $S_3$, and when other region of the regions 51 and 52 in the screen is set as a state $S_1$, as shown in FIG. 3, the state transition is performed as shown in FIG. 4.

In the state $S_1$, the state $S_1$ changes to the state $S_2$ when the conditions of "$x_0<x$", "$x\leqq x_1$", "$y_0<y$" and "$y\leqq y_1$" are established in the state $S_1$, the state $S_2$ changes to the state $S_3$ when the conditions of "$x_2<x$", "$x\leqq x_3$", "$y_2<y$" and "$y\leqq y_3$" are established in the state $S_2$, but the state $S_1$ remains when the above conditions are not established. In the state $S_2$, the state $S_2$ changes to state $S_1$ when the condition of "$x>x_1$" is established, but the state $S_2$ remains when the condition is not established. In the state $S_3$, the state $S_3$ changes to state $S_1$ when the condition of "$x>x_3$" is established, but the state $S_3$ remains when the condition is not established. Since the conditional equations are eight for one comparison in the method, it is necessary to provide eight comparators.

Next, it is possible to provide a case where a rectangular region shown in FIG. 5 is interposed in another rectangular region. A coordinate in the upper left corner of the first rectangular region 51 is set to ($x_0$, $y_0$), a coordinate in the lower right corner of the first rectangular region 51 is set to ($x_1$, $y_1$), a coordinate in the upper left corner of the second rectangular region 52 is set to ($x_2$, $y_2$), and a coordinate in the lower right corner of the second rectangular region 52 is set to ($x_3$, $y_3$). A state $S_2$ is set in an inside of the first rectangular region 51 and an outside of the second rectangular region 52, a state $S_3$ is set in an inside of the rectangular region 52, a state $S_1$ is set in an outside of rectangular region 51, as shown in FIG. 5. As shown in 6, the state transition is performed when an initial state is supposed to be the state $S_1$.

In the state $S_1$, the state changes to the state $S_2$ when the conditions of "$x_0<x$", "$x\leqq x_1$", "$y_0<y$" and "$y\leqq y_1$" are established in the state $S_1$, but the state $S_1$ remains when the above conditions are not established. In the state $S_2$, the state $S_2$ changes to state $S_1$ when the condition of "$x>x_1$" is established, the state $S_2$ changes to the state $S_3$ when the conditions of "$x_2<x$", "$x\leqq x_3$", "$y_2<y$" and "$y\leqq y_3$" are established in the state $S_2$, but the state $S_2$ remains when the condition is not established. In the state $S_3$, the state $S_3$ changes to state $S_2$ when the condition of "$x>x_3$" is established, but the state $S_3$ remains when the condition is not established. Since the conditional equations are four for one comparison in the method, it is necessary to provide four comparators.

In this manner, four comparators should be provided for comparing boundary coordinate of the rectangular region with the values in the raster scan counter which calculates a present position. Accordingly, if the rectangular regions become a predetermined numbers more than three, it is necessary to provide a plurality of comparators corresponding to the predetermined numbers in the conventional method.

There is described a image processing system used in the above-mentioned conventional image processing method with reference to the figure. FIG. 7 is a block diagram showing the image processing system as a hardware for utilizing the image processing method.

In the figure, the image processing system comprises X-side image signal processing means 10 and Y-side image signal processing means 20. The X-side processing means 10 comprises a register 11 for sequentially storing step data for performing an increment in the order for a desired X-side scanning step width externally set, an adder 12 for adding two input data signals in which one input is the step data supplied from the register 11, a register 13 for storing and sequentially outputting X-direction changes on a motion picture screen by sequentially renewed initial screen externally set on the basis is an added output of the adder 12, address signal generators 14 and 15 respectively generating address signals with respect to respective start and end positions on the X-direction of a window on the basis of address data externally set, a comparator 16 for directing an X-direction starting position of the window by comparing the output signals of the register 13 and address signal generator 14, and a comparator 17 for directing an X-direction ending position of the window by comparing the output signals of the register 13 and address signal generator 15.

Further, the Y-side processing means 20 comprises a register 21 for sequentially storing step data for performing an increment in the order for a desired Y-side sub scanning step width externally set, an adder 22 for adding two input data signals in which one input is the step data supplied from the register 21, a register 23 for storing and sequentially outputting Y-direction changes on a motion picture screen by sequentially renewed initial screen externally set on the basis of an added output of the adder 22, address signal generators 24 and 25 respectively generating address signals with respect to respective start and end positions on the Y-direction of a window on the basis of address data externally set, a comparator 26 for directing a Y-direction starting position of the window by comparing the output signals of the register 23 and address signal generator 24, and a comparator 27 for directing a Y-direction ending position of the window by comparing the output signals of the register 23 and address signal generator 25.

Entire outputs of the comparators 16 and 17 on the X side and 26 and 27 on the Y side as their comparison results are respectively supplied to a sequencer 8 to output them for displaying the desired window with matching a scanning of the motion picture screen.

As described above, it is necessary for the conventional image processing system to provide four comparators 16, 17, 28 and 27 as shown in FIG. 7, thereby resulting the problem that the system scale becomes larger.

As described above, in the conventional method in which states are divided into the inside and outside of the rectangular region and the state transition are performed by determining as to whether the state resides in the inside or outside of the rectangular region, it is necessary to provide at least four comparators in order to compare the present position with the boundary coordinates of the rectangular region, thereby increasing the numbers of the comparators corresponding to the increase of the rectangular regions.

Since the comparator has generally a large circuit scale, a provision of a plurality of comparators results a large scale of the entire system.

SUMMARY OF THE INVENTION

In view of the above-mentioned condition, an object of the present invention is to provide a method and system for processing images, capable of determining as to whether a state is an inside or outside of a rectangular region by a small circuit scale.

Many non-interlaced scanning have main scanning direction being horizontal and sub scanning direction being vertical. However, it is possible to change the scanning direction, namely, the main scanning direction is vertical and the sun scanning direction is horizontal.

In order to achieve the above object, an image processing method according to the present invention includes a step of using counted values of first and second counters, respectively, of which the first counter has an increment at each pixel performed by a non-interlaced scanning and is reset by a final pixel of each of main scanning lines, and the second counter has an increment at each final pixel of each of main scanning lines and is reset by a final pixel of an end of a sub scanning line, a step of dividing an entire screen into a plurality of divided regions encircled by an outer periphery and extended lines of each of sides of a rectangular region and existing in both portions in the sub scanning direction, and a step of allotting a plurality of states to each of the divided regions: and the image processing method further comprises a step of changing a state of a region in which both ends in the main scanning direction coincides with both ends of the screen, to a state of a region in which a start end in the main scanning direction coincides with an end of the screen and which is adjacent in the sub scanning direction as a standard of the present region when the counted value of the second counter is over a coordinate of a final end in the sub scanning direction;

a step of changing a state of a region in which a final end in the main scanning direction is in coincident with an end of the screen, to a state of a region adjacent in the main scanning direction when the counted value of the first counter is over a coordinate of a final end in the main scanning direction; and a step of changing a state of a region in which a final end in the main scanning direction coincides with an end of the screen and a start end in the main scanning direction is incoincident with an end of the screen, to a state of a region which is adjacent to the present region in the sub scanning direction and in which a start end in the main scanning direction coincides with an end of the screen when the counted value of the first counter is over a coordinate of a final end in the main scanning direction and when the counted value of the second counter is less than a coordinate of a final end in the sub scanning direction, and of alternatively changing the state of the region in which the final end in the main scanning direction coincides with the end of the screen and the start end in the main scanning direction is incoincident with the end of the screen, to a state of a region in which a start end in the main scanning direction coincides with an end of the screen and which will be succeedingly scanned in the sub scanning direction when the counted value of the first counter is over a coordinate of a final end in the main scanning direction and when the counted value of the second counter is over a coordinate of a final end in the sub scanning direction.

The image processing method for determining an inside or outside of the rectangular region (window) on the basis of counted values of the first and second raster scanning counters, comprises a step of dividing the entire screen by a region which is encircled by an outer peripheral and straight lines extended from each sides of a rectangular region separated in the sub scanning direction, a step of performing a state transition corresponding to the present scanning position, a step of determining a state to be changed by the counted value of the second counter when both ends in the main scanning direction coincides with both ends of the screen, a step of determining a state to be changed by the counted value of the first counter when an end portion in the main scanning direction does not coincide with an end of the screen, and a step of determining a state to be changed by the counted value of the second counter when an end portion in the main scanning direction does not coincide with an end of the screen and when a starting end does not coincide with an end of the screen.

An image processing system according to the present invention for displaying different images on inside and outside of a window which is opened at an arbitrary portion on a screen: comprises a first register for sequentially storing first step data which are formed by a sequential increment for a desired step width in a scanning direction;

a first adder for adding two input data having at least as one input the first step data from the first register;

a second register for first storing an initial screen which is externally set on the basis of an added result from the first adder and for sequentially storing change components of a motion picture screen in the scanning direction by sequentially renewing the initial screen to output them;

a third register for sequentially storing second step data which are formed by a sequential increment for a desired step width in an orthogonal direction of the scanning direction;

a second adder for adding two input data having at least as one input the second step data from the third register;

a fourth register for first storing an initial screen which is externally set on the basis of an added result from the second adder and for sequentially storing change components of the motion picture screen in the orthogonal direction of the scanning direction by sequentially renewing the initial screen to output them;

a node for supplying both outputs of the second and fourth registers;

a window screen setting registers group including first and second address signal generators which generate address signals of starting and ending positions of the window in the scanning direction, respectively, and third and fourth address signal generators which generate address signals of starting and ending positions of the window in the orthogonal direction of the scanning direction;

a comparator for comparing an output of the node with an output from the window screen setting resisters group; and a sequencer for supplying an output of a comparison result of the comparator to the window screen setting registers group and for sequentially outputting a window set signal on the basis of the registers group.

Since the raster scan counter determines as to whether or not ends of the region is ends of the screen in the non-interlaced scanning, it is unnecessary to use a comparator for determining as to whether or not the end of the region is over the coordinate of the final end of the screen. In the present invention, since the present position is simply compared with the boundary coordinate of each region, it is possible to provide only one comparator, thereby largely reducing the circuit scale.

As clearly understood by the above description, even though the conventional method needs four comparators in addition to a circuit using a raster scan counter for determining an end of a rectangular region when the rectangular region is one, and even though a plurality of comparators become four times of the number of the rectangular regions which are plural numbers and does not interposed one another, the present invention results an effect that a small circuit scale can correspond to an image processing having a wide usage because the present invention only provides one comparator with the raster scan counter despite of a number and position of the rectangular region.

DETAILED DESCRIPTION OF THE PREFERRED EMBODIMENTS

There will be described in detail a method and system for processing an image according to preferred embodiments of the present invention in reference with the attached drawings.

Figure 1:
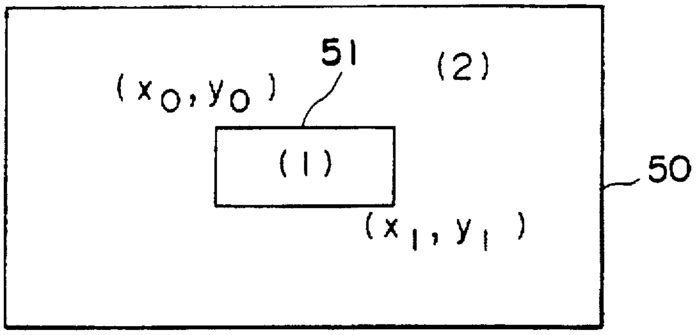
FIG. 1 PRIOR ART
FIG. 1 is a front view showing an example for dividing one screen for explaining the conventional image processing method.
Figure 2:
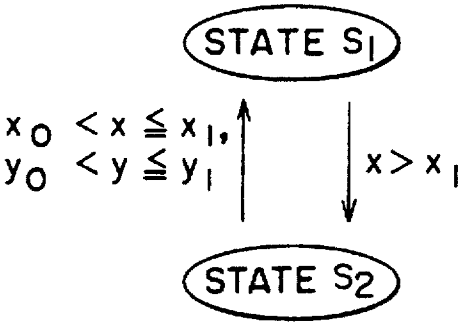
FIG. 2 PRIOR ART
FIG. 2 is a state transition diagram corresponding to the example of a screen division shown in FIG. 1.
Figure 3:
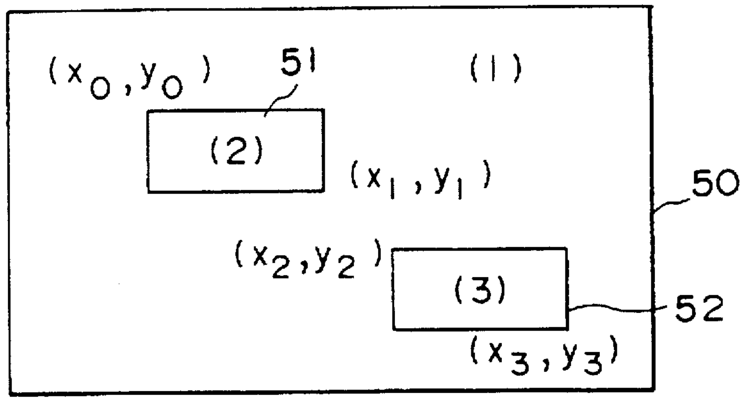
FIG. 3 PRIOR ART
FIG. 3 is a front view showing another example for dividing one screen for explaining the conventional image processing method.
Figure 4:
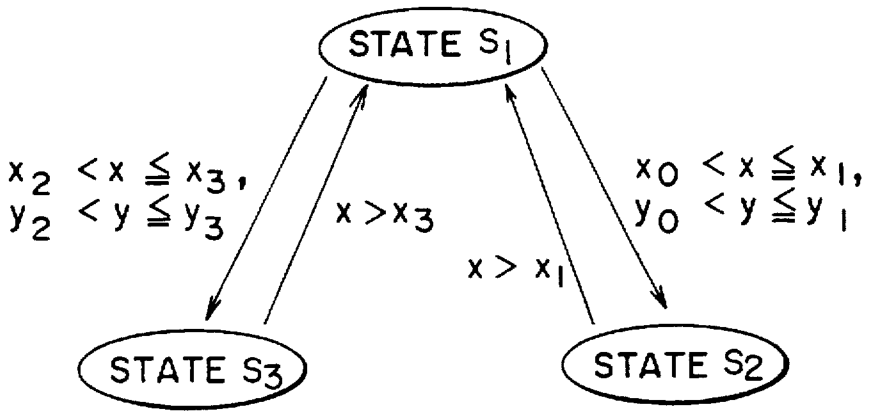
FIG. 4 PRIOR ART
FIG. 4 is a state transition diagram corresponding to the example of a screen division shown in FIG. 3.
Figure 5:
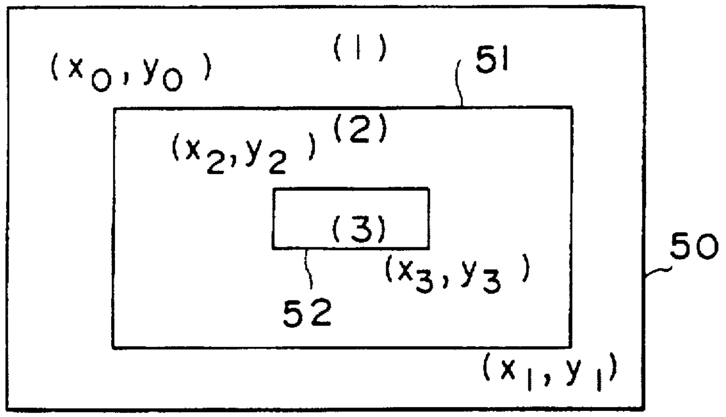
F I G . 5 PRIOR ART
FIG. 5 is a front view showing still another example for dividing one screen for explaining the conventional image processing method.
Figure 6:
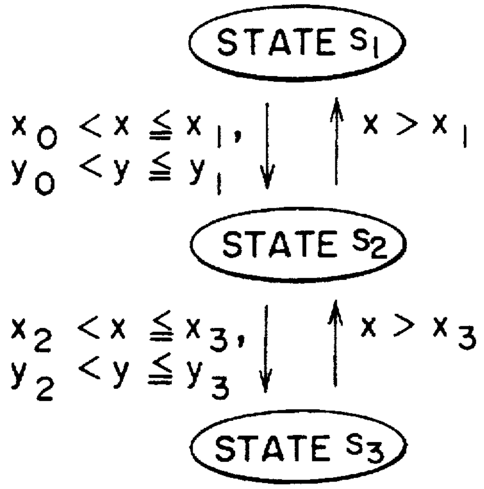
F I G . 6 PRIOR ART
FIG. 6 is a state transition diagram corresponding to the example of a screen division shown in FIG. 5.
Figure 7:
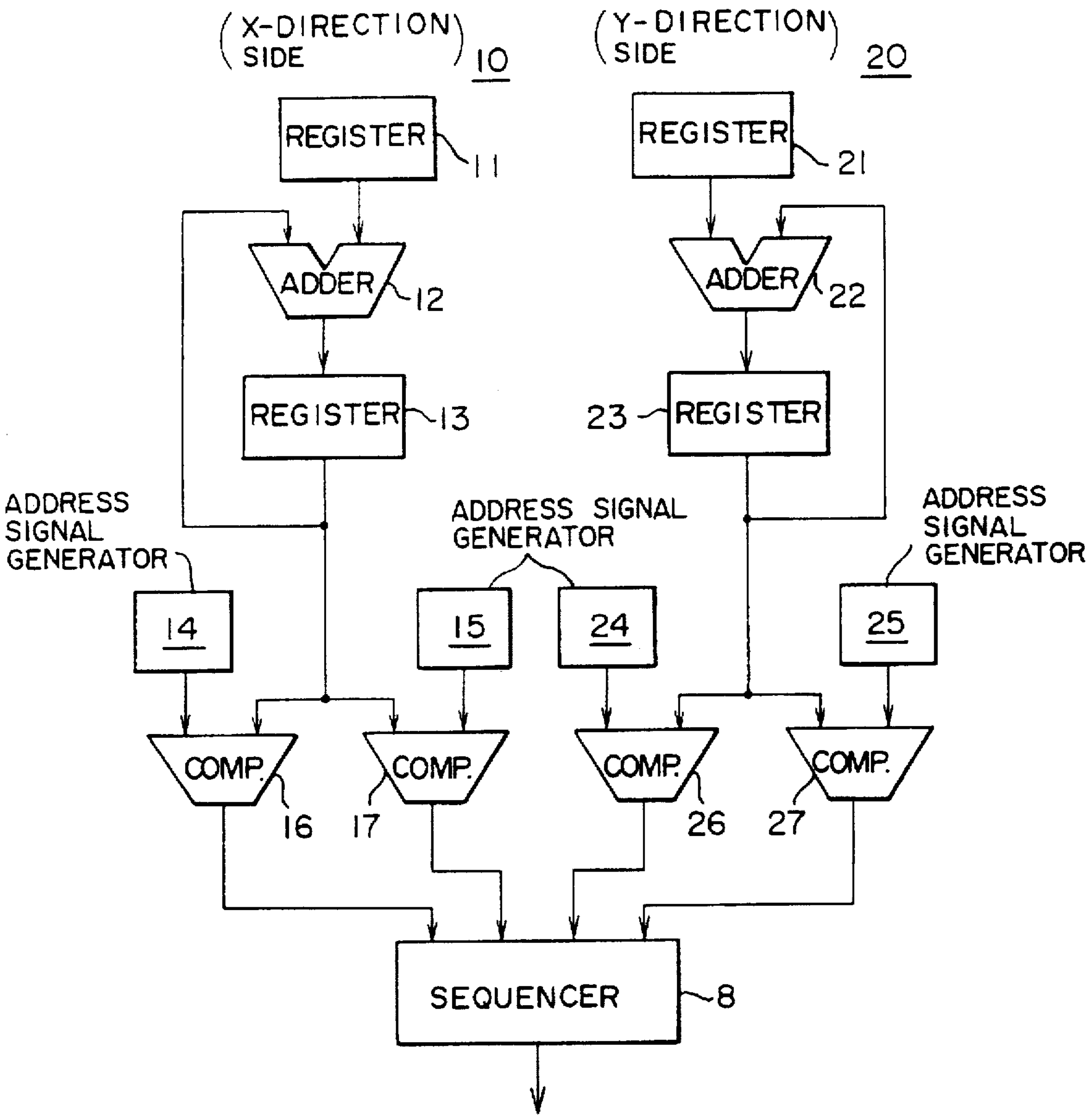
F I G . 7 PRIOR ART
FIG. 7 is a block diagram showing the conventional image processing system.
Figure 8:
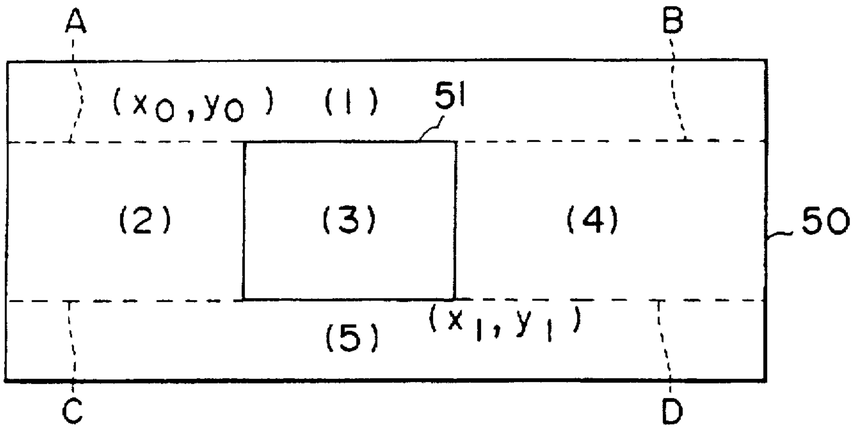
FIG. 8 is an explanatory view showing an example for dividing a screen in an image processing method according to a first embodiment of the present invention.
Figure 9:
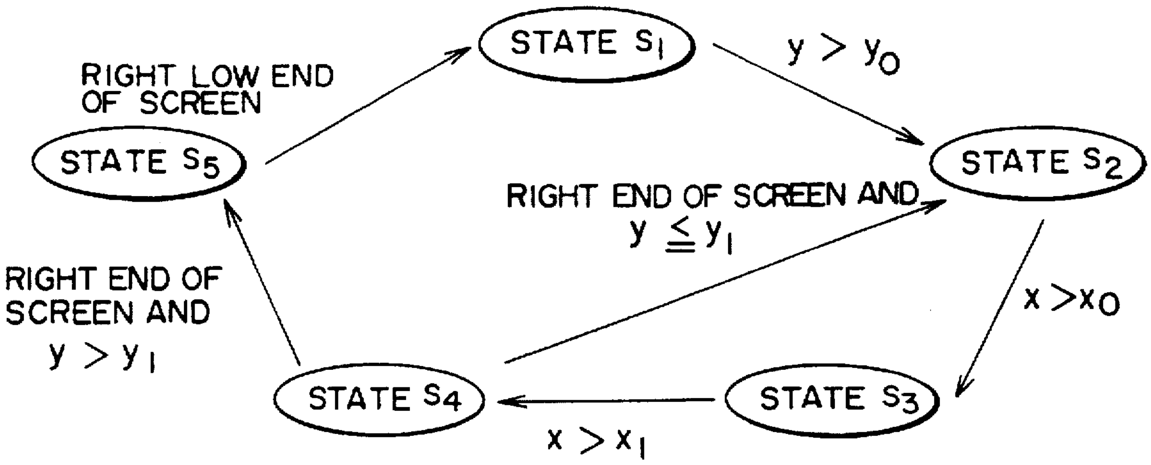
FIG. 9 is a state transition diagram corresponding to the example of a screen division shown in FIG. 8.

FIG. 8 shows the first embodiment as the simplest example to which the present invention is applied. In FIG. 8, a screen 50 is divided into a rectangular region 51 and a peripheral region thereof, in which a coordinate of an upper left corner of the rectangular region 51 is $(x_0, y_0)$, and a coordinate of a lower right corner of the rectangular region 51 is $(x_1, y_1)$. Here, hypothetical straight lines A and B are extended from an upper side of the rectangular region 51 in right and left directions, and hypothetical straight lines C and D are extended from a lower side of the rectangular region 51. By this, the screen is divided into five regions to which processing states are allotted, namely, a state $S_1$ is allotted to an upper region over the upper side of the rectangular region 51, a state $S_2$ is allotted to a left portion of the rectangular region 51, a state $S_3$ is allotted to an inside of the rectangular region 51, a state $S_4$ is allotted to a right portion of the rectangular region 51, and a state $S_5$ is allotted to under portion of the rectangular region 51. A state transition is performed as shown in FIG. 2 under the condition that the state $S_1$ is an initial state.

Accordingly, the state $S_1$ changes to the state $S_2$ when the condition of $y_0<y$ is established, and the state $S_1$ remains when the condition is not established. The state $S_2$ changes to the state $S_3$ when the condition of $x>x_0$ is established, and the state $S_2$ remains when the condition is not established. The state $S_3$ changes to the state $S_4$ when the condition of $x>x_1$ is established, and the state $S_3$ remains when the condition is not established. The state $S_4$ changes to the state $S_5$ when the condition $y_1<y$ in the right end of the screen is established, the state $S_4$ changes to the state $S_2$ when the condition $y_1 \geqq y$ in the right end of the screen is established, and the state $S_4$ remains when both conditions are not established. The state $S_5$ changes to the state $S_1$ when the condition in the lower end of the screen is established, and the state $S_5$ remains when the condition is not established. By the above determination, the state $S_3$ is in the rectangular region 51 and other states except the state $S_3$ are out of the rectangular region.

In the first embodiment, since only one conditional equation is provided for one comparison, the comparator is also only one. Furthermore, since the determination at the end of the screen is performed by a raster scanning counter, it is possible to avoid duplicated circuits.

Figure 10:
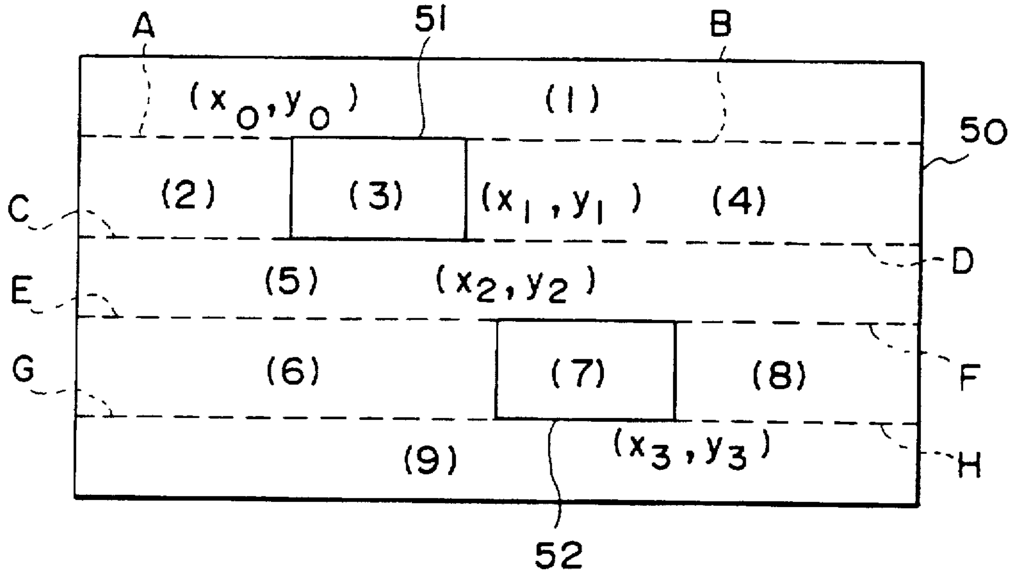
FIG. 10 is an explanatory view showing an example for dividing a screen in an image processing method according to a second embodiment of the present invention.
Figure 11:
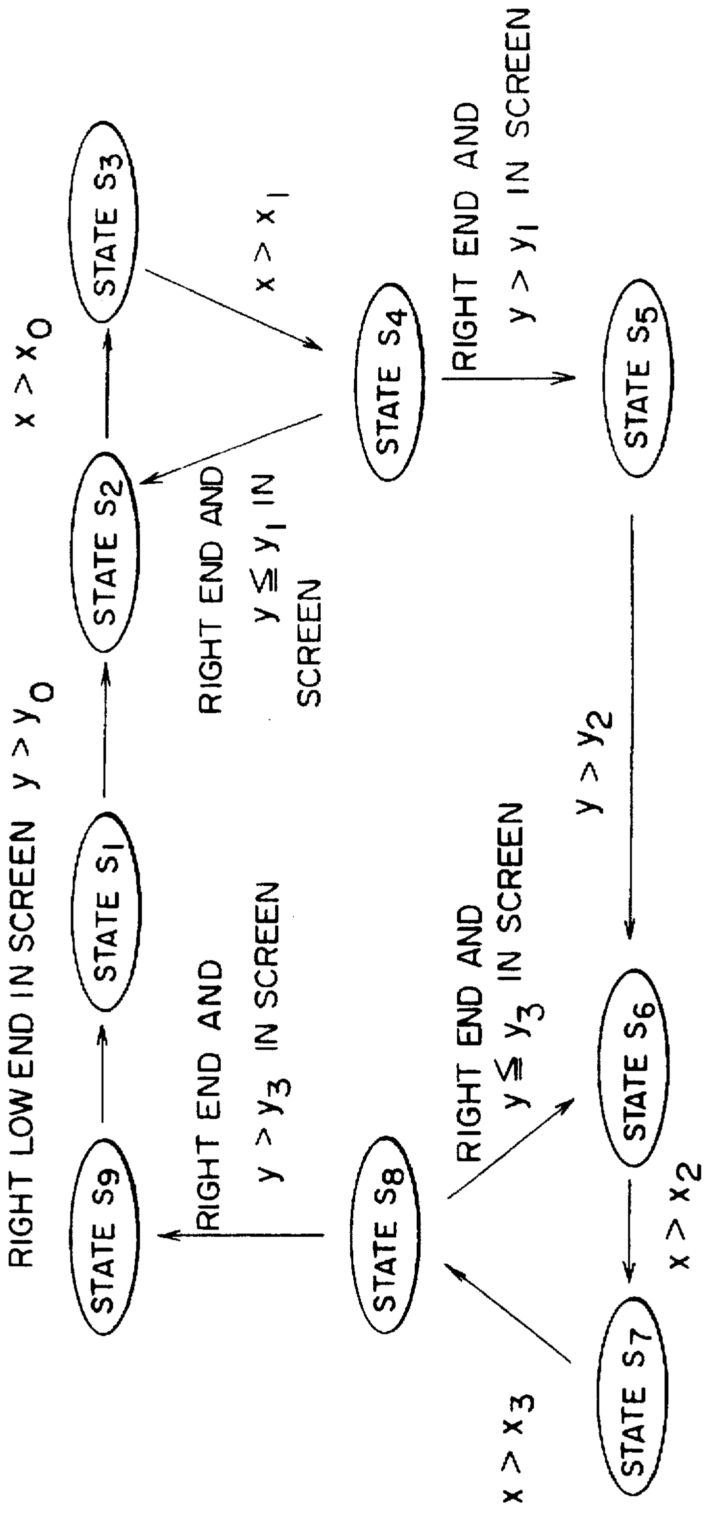
FIG. 11 is a state transition diagram corresponding to the example of a screen division shown in FIG. 10.
Figure 12:
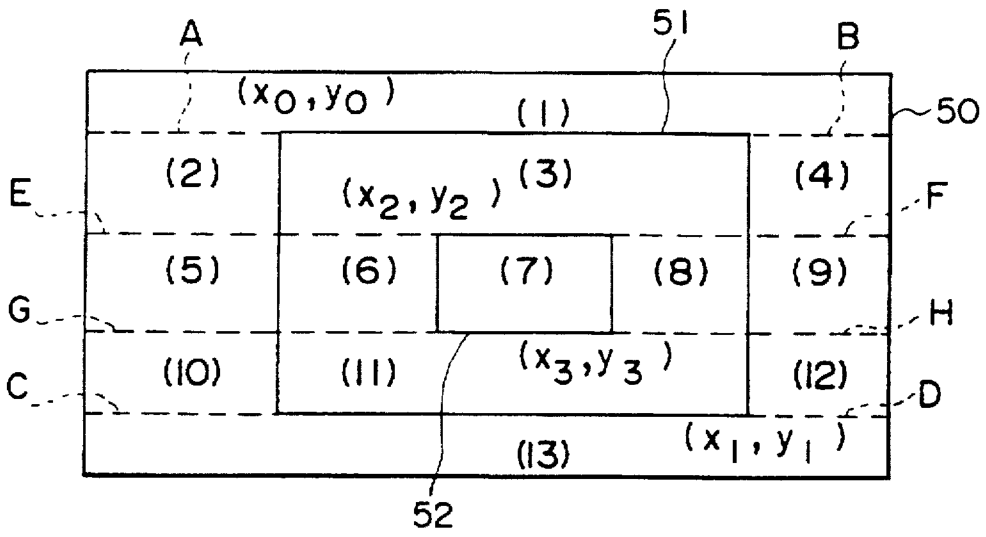
FIG. 12 is an explanatory view showing an example for dividing a screen in an image processing method according to a third embodiment of the present invention.

FIG. 10 shows a case where two rectangular regions as an example of a plurality of rectangular regions existing in the screen 50, and FIG. 11 shows a state transition diagram of the case shown in FIG. 10 as a second embodiment.

At this portion in the description, a coordinate in the upper left corner of a first rectangular region 51 is $(x_0, y_0)$, and a coordinate in lower right corner is $(x_1, y_1)$. A coordinate in the upper left corner of a second rectangular region 52 is $(x_2, y_2)$, and a coordinate in lower right corner is $(x_3, y_4)$. In this case, hypothetical straight lines A and B are extending to right and left from the upper side of the first rectangular region 51, and hypothetical straight lines C and D are extending to right and left from the lower side of the region 51. Furthermore, hypothetical straight line E and F are extending to right and left from the upper side of the second rectangular region 52, and hypothetical straight lines G and H are extending to right and left from the lower side of the second region 52. These straight lines A–H divide the screen into nine regions. Processing states are allotted to the divided nine regions, respectively. An allotment is performed in the manner that the state $S_1$ is to an upper region of the upper side of the rectangular region 51, the state $S_2$ is to a left region of the rectangular region 51, the state $S_3$ is to an inside of the rectangular region 51, the state $S_4$ is to a right region of the rectangular region 51, and the state $S_5$ is to the lower region of the rectangular region 51, respectively. Also, the state $S_6$ is allotted to a left region of the second rectangular region 52, the state $S_7$ is to an inside of the rectangular region 52, the state $S_8$ is to a right region of the rectangular region 52, and the state $S_9$ is to a lower region of the second rectangular region 52, respectively.

A state transition is now performed as being an initial state of the state $S_1$ as shown in FIG. 11. The state $S_1$ changes to the state $S_2$ when the condition $y_0<y$ is established, and the state $S_1$ remains when the condition is not established. The state $S_2$ changes to the state $S_3$ when the condition $x>x_0$ is established, and the state $S_2$ remains when the condition is not established. The state $S_3$ changes to the state $S_4$ when the condition $x>x_1$ is established, and the state $S_3$ remains when the condition is not established. The state $S_4$ changes to the state $S_2$ when the condition $y_1 \geqq y$ in the right end of the screen, the state $S_4$ changes to the state $S_5$ when the condition $y_1<y$ is established in the right end of the screen, and the state $S_4$ remains when both conditions are not established. The state $S_5$ changes to the state $S_6$ when the condition $y_2<y$ is established, and the state $S_5$ remains when the condition is not established. The state $S_6$ changes to the state $S_7$ when the condition $x>x_2$ is established, and the state $S_6$ remains when the condition is not established. The state $S_7$ changes to the state $S_8$ when the condition $x>x_3$ is established, and the state $S_7$ remains when the condition is not established. The state $S_8$ changes to the state $S_6$ when the condition $y_3 \geqq y$ in the right end of the screen, the state $S_8$ changes to the state $S_9$ when the condition $y_3<y$ is established in the right end of the screen, and the state $S_8$ remains when both conditions are not established. The state $S_9$ changes to the state $S_1$ when the position is in a lower end of the screen, and the state $S_9$ remains when the condition is not established. By the above determination, the state $S_3$ is determined to be an inside of the first rectangular region 51, and the state $S_7$ is determined to be an inside of the second rectangular region 52, thereby determining other states to be an outside of the rectangular regions 51 and 52.

In the second embodiment, since only one conditional equation is used for comparing the states, only one comparator should be provided. Since the determination on end portions of the screen is performed by a raster scanning counter, the duplication of the circuits can be avoided.

Figure 13:
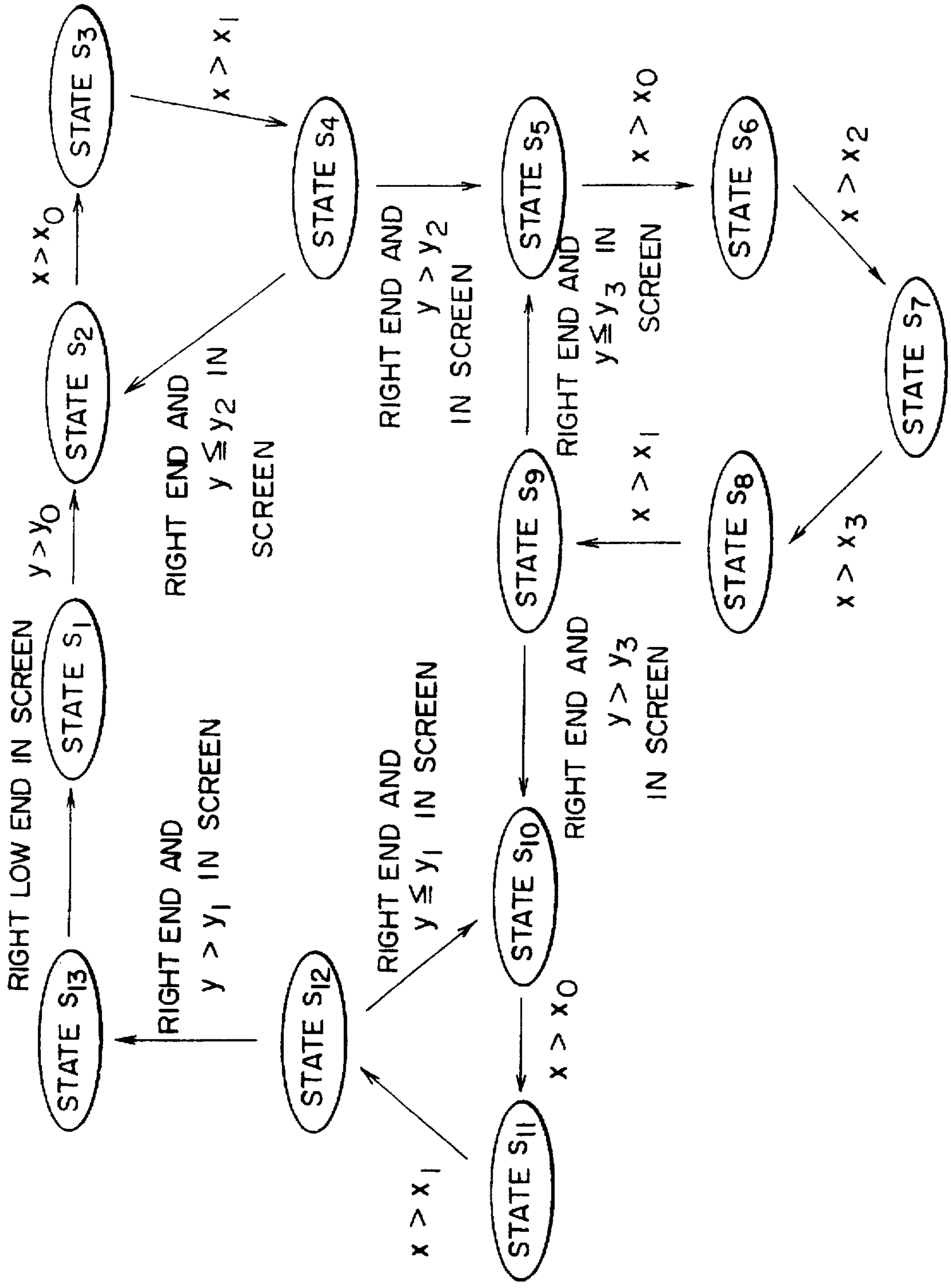
FIG. 13 is a state transition diagram corresponding to the example of a screen division shown in FIG. 12.

Next, there will be described an image processing method according to a third embodiment of the present invention, in which a small window is inserted into a large window on the screen as duplicated rectangular regions, and the state transition is shown in FIG. 13. In the third embodiment, the second rectangular region 52 is included in the first rectangular region 51, a coordinate of the upper left corner of the first rectangular region 51 is set to be $(x_0, y_0)$, and a coordinate of the lower right corner is to be $(x_1, y_1)$. Furthermore, a coordinate of the upper left corner of the second rectangular region 52 is set to be $(x_2, y_2)$, and a coordinate of the lower right corner is to be $(x_3, y_3)$. Here, hypothetical straight lines A and B are extending to right and left from the upper side of the first rectangular region 51, and hypothetical straight lines C and D are extending to right and left from the lower side of the region 51. Furthermore, hypothetical straight line $L_E$ and $L_F$ are extending to right and left from the upper side of the second rectangular region 52, and hypothetical straight lines G and H are extending to right and left from the lower side of the second region 52. These straight lines A–H divide the screen into thirteen regions. Processing states are allotted to the divided thirteenth regions, respectively.

An allotment is performed in the manner that the state $S_1$ is to an upper region of the upper side of the rectangular region 51, the state $S_2$ is to a left region of the rectangular region 51, the state $S_3$ is to an inside of the rectangular region 51 and the upper portion of the upper side of the second rectangular region 52, the state $S_4$ is to a right region of the rectangular region 51 and the upper portion of the upper side of the second rectangular region 52, and the state $S_5$ is to the left region of the rectangular region 51 between the upper and lower sides of the second rectangular region 52, respectively. Also, the state $S_6$ is allotted to a left region of the second rectangular region 52 and inside the first rectangular region 51, the state $S_7$ is to an inside of the rectangular region 52, the state $S_8$ is to a right region of the rectangular region 52 and inside the first rectangular region 51, and the state $S_9$ is to a right region of the first rectangular region 51 between the upper side and the lower side of the second rectangular region 52, respectively. The state $S_{10}$ is to a left region of the first rectangular region 51 and the lower portion of the lower side of the second rectangular region 52, the state $S_{11}$ is to a portion inside of the first rectangular region 51 and a lower portion of the lower side of the second region 52, the state $S_{12}$ is to a right portion of the first rectangular region 51, and the state $S_{13}$ is to a lower portion of the first rectangular region 51, respectively. In this case, the state transition is performed as being the state $S_1$ to be an initial state as shown in FIG. 13.

Accordingly, the state $S_1$ changes to the state $S_2$ when the condition $y_0<y$ is established, and the state $S_1$ remains when the condition is not established. The state $S_2$ changes to the state $S_3$ when the condition $x>x_0$ is established, and the state $S_2$ remains when the condition is not established. The state $S_3$ changes to the state $S_4$ when the condition $x>x_1$ is established, and the state $S_3$ remains when the condition is not established. The state $S_4$ changes to the state $S_2$ when the condition $y_2 \geqq y$ in the right end of the screen is established, the state $S_4$ changes to the state $S_5$ when the condition $y_2<y$ is established in the right end of the screen, and the state $S_4$ remains when both conditions are not established. The state $S_5$ changes to the state $S_6$ when the condition $x>x_0$ is established, and the state $S_5$ remains when the condition is not established. The state $S_6$ changes to the state $S_7$ when the condition $x>x_2$ is established, and the state $S_6$ remains when the condition is not established. The state $S_7$ changes to the state $S_8$ when the condition $x>x_3$ is established, and the state $S_7$ remains when the condition is not established. The state $S_8$ changes to the state $S_9$ when the condition $x>x_1$ is established, the state $S_8$ remains when the condition is not established. The state $S_9$ changes to the state $S_5$ when the condition $y_3 \geqq y$ in the right end of the screen is established, the state $S_9$ changes to the state $S_{10}$ when the condition $y_3$21 y is established in the right end of the screen, and the state $S_9$ remains when both conditions are not established. The state $S_{10}$ changes to the state $S_{11}$ when the condition $x>x_0$ is established, and the state $S_{11}$ remains when the condition is not established. The state $S_{12}$ changes to the state $S_{13}$ when the condition $y_1<y$ is established, the state $S_{12}$ changes to the state $S_{10}$ when the condition $y_1 \geqq y$ at the right end of the screen is established, and the state $S_{12}$ remains when both conditions are not established. The state $S_{13}$ changes to the state $S_1$ when the portion is at a lower end of the screen, and the state $S_{13}$ remains when the portion is not in the lower in the screen. By the above determination, the states $S_3$, $S_6$, $S_8$ and $S_{11}$ are determined to be inside of the rectangular region 51 and outside of the rectangular region 52, the state $S_7$ is determined to be an inside of the first rectangular region 51, and the state $S_7$ is determined to be an inside of the second rectangular region 52, thereby determining other states to be an outside of the rectangular region 51.

In the third embodiment, since only one conditional equation is used for comparing the states, only one comparator should be provided. Since the determination on end portions of the screen is performed by a raster scanning counter, the duplication of the circuits can be avoided.

Even though all of the above-mentioned embodiments relate to a technology that the main scanning direction is along the horizontal direction and the sub scanning direction is along the vertical direction, the present invention is not limited in the above technology, namely, it is possible to apply the present invention in the method that the main scanning direction is along the vertical direction, and sub scanning direction is along the horizontal direction.

Figure 14:
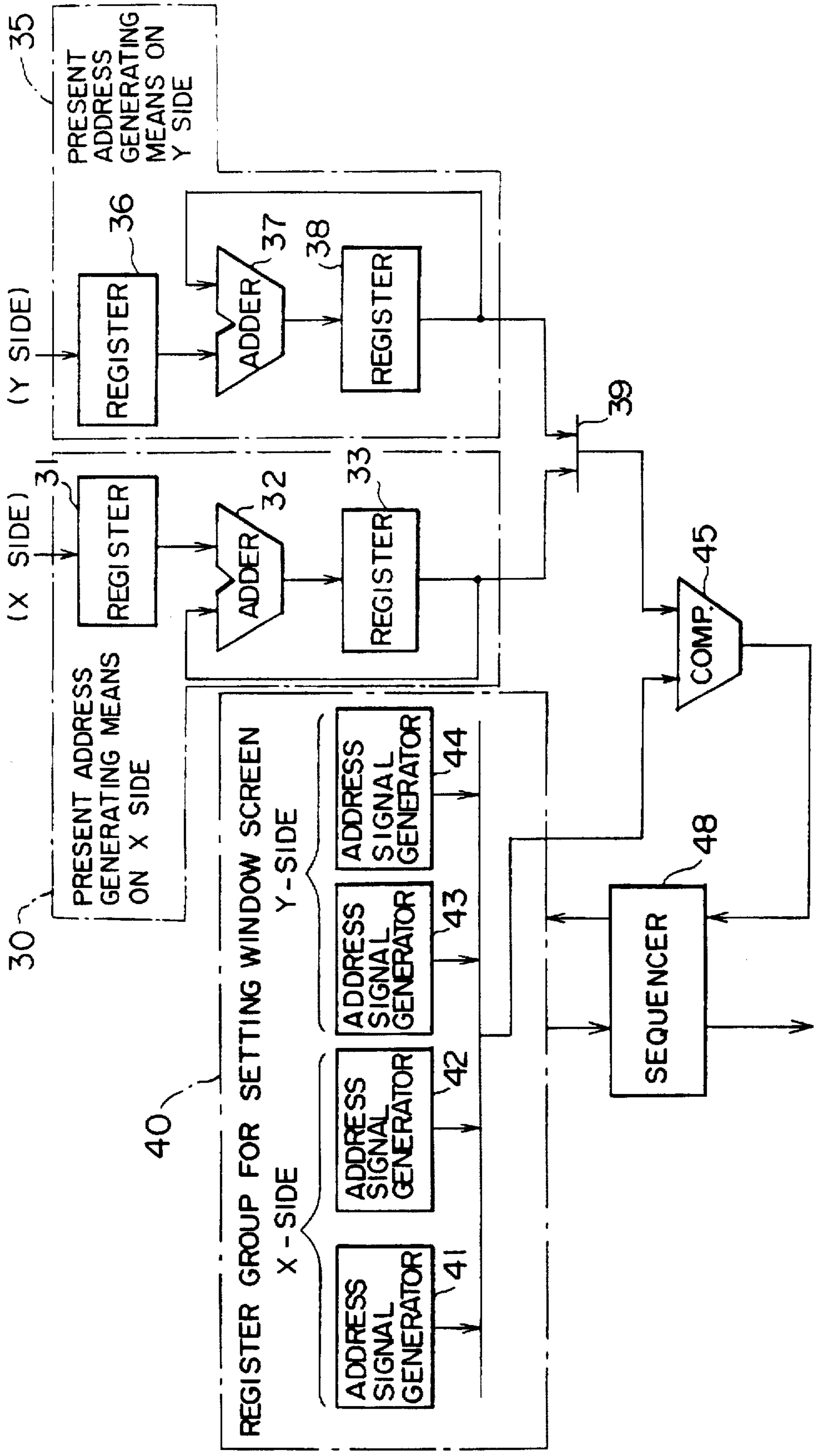
FIG. 14 is a block diagram showing an image processing system according to a fourth embodiment of the present invention.

Also, even though all of the above-mentioned preferred embodiments is described with the image processing method, there will be described an image processing system for utilizing the above-mentioned image processing methods. FIG. 14 is a block diagram showing a schematic construction of the image processing system according to a fourth embodiment of the present invention.

The image processing system according to the fourth embodiment of the present invention comprises, as shown in FIG. 14, present address generating means 30 on the X side for generating a present position along the X-direction, namely the main scanning direction, present address generating means 35 on the Y side for generating a present position along the Y-direction, namely the sub scanning direction, connecting means 39 for generating the present addresses on both sides of X- and Y-directions, start and end addresses generating means 40 for respectively generating start addresses and end addresses on both sides of X- and Y-directions, respectively, comparison means 45 for comparing the present address on both sides of X- and Y-directions with the start addresses and the end addresses on both sides of the X- and Y- directions, and sequencer means 48 for sequentially processing an image signal in the manner of forming a rectangular region on a screen.

In FIG. 14, the image processing system further comprises a register 31 for sequentially storing step data which are formed by a sequential increment of the desired scanning step width on the X-side to be set by an external device, an adder 32 for adding two input data signals including as one input signal the step data supplied from the register 31, and a register 33 for sequentially storing change components in the X-direction of a motion picture screen by first storing an initial screen externally set on the basis of an added output of the adder 32 and by then renewing the data from the initial screen. The image processing system further comprises a register 36 for sequentially storing step data which are formed by a sequential increment of the desired scanning step width on the Y-side to be set by an external device, an adder 37 for adding two input data signals including as one input signal the step data supplied from the register 36, a register 38 for sequentially storing change components in the Y-direction of a motion picture screen by first storing an initial screen externally set on the basis of an added output of the adder 37 and by then renewing the data from the initial screen, and a node 39 for supplying both outputs of the registers 33 and 38 to a comparator 45. In FIG. 14 the comparator 45 has two inputs, one of which is any one of outputs of the generators 41–44, and the other of which is any of the outputs of the registers 33 and 38, in which both inputs are changed over by the sequencer 48. The sequencer 48 selects any of the registers 33 and 38 as one of the inputs by controlling the output at the node 39 and any of the generators 41–44 as the other of the inputs to determine two inputs in accordance with the state in the region. When the output of the comparator 45 is over the threshold value, the sequencer determines the next compared inputs to compare in the next state. In addition, the system comprises a registers group 40 for setting a window screen and each of which outputs an address signal, respectively, the comparator 45 for comparing the address signal sequentially supplied from the register group 40 with image signals supplied from the registers 33 and 38, and a sequencer 48 for supplying an output of the comparison result of the comparator 45 to the registers group 40 and for sequentially outputting a window setting signal on the basis of the address signals of the registers group 40. The registers group 40 for setting the window screen comprises address signal generators 41 and 42 for respectively generating address signals with respective to a starting position and an ending position on the X-side, and address signal generators 43 and 44 for respectively generating address signals with respective to a starting position and an ending position on the Y-side.

Since the image processing system according to the fourth embodiment of the present invention has the above configuration, it is possible to operate along the above-mentioned method described in first through third embodiments as a hardware.

What is claimed is:

1. An image processing method including a step of using counted values of first and second counters, respectively, of which the first counter has an increment at each pixel performed by a non-interlaced scanning and is reset by a final pixel of each of main scanning lines, and the second counter has an increment at each final pixel of each of main scanning lines and is reset by a final pixel of an end of a sub scanning line, a step of dividing an entire screen into a plurality of divided regions encircled by an outer periphery and extended lines of each of sides of a rectangular region and existing in both portions in the sub scanning direction, and a step of allotting a plurality of states to each of the divided regions:

the image processing method further comprises a step of changing a state of a region in which both ends in the main scanning direction coincides with both ends of the screen, to a state of a region in which a start end in the main scanning direction coincides with an end of the screen and which is adjacent in the sub scanning direction as a standard of the present region when the counted value of the second counter is over a coordinate of a final end in the sub scanning direction;

a step of changing a state of a region in which a final end in the main scanning direction is in coincident with an end of the screen, to a state of a region adjacent in the main scanning direction when the counted value of the first counter is over a coordinate of a final end in the main scanning direction;

a step of changing a state of a region in which a final end in the main scanning direction coincides with an end of the screen and a start end in the main scanning direction is incoincident with an end of the screen, to a state of a region which is adjacent to the present region in the sub scanning direction and in which a start end in the main scanning direction coincides with an end of the screen when the counted value of the first counter is over a coordinate of a final end in the main scanning direction and when the counted value of the second counter is less than a coordinate of a final end in the sub scanning direction; and a step of alternatively changing the state of the region in which the final end in the main scanning direction coincides with the end of the screen and the start end in the main scanning direction is incoincident with the end of the screen, to a state of a region in which a start end in the main scanning direction coincides with an end of the screen and which will be succeedingly scanned in the sub scanning direction when the counted value of the first counter is over a coordinate of a final end in the main scanning direction and when the counted value of the second counter is over a coordinate of a final end in the sub scanning direction wherein each step of changing the state is determined by comparing only one of the counter values in the first and second counters at a time.

2. The image processing method according to claim 1:

wherein a screen is divided into two rectangular regions of a large region and a small region, in which a coordinate of an upper left corner of the small region is ($x_O$, $y_O$), and a coordinate of a lower right corner of the small region is ($x_1$, $y_1$), first and second hypothetical straight lines are extended from an upper side of the small region in right and left directions, and third and fourth hypothetical straight lines are extended from a lower side of the small region, the screen is divided into five regions to which processing states are allotted, namely, a first state is allotted to an upper region over the upper side of the small region, a second state is allotted to a left portion of the small region, a third state is allotted to an inside of the small region, a fourth state is allotted to a right portion of the small region, and a fifth state is allotted to under portion of the small region;

wherein the first state changes to the second state when the condition of $y_O<y$ is established, and the state remains when the condition is not established, the second state changes to the third state when the condition of $x>x_O$ is established, and the second state remains when the condition is not established;

the third state changes to the fourth state when the condition of $x>x_1$ is established, and the state $S_3$ remains when the condition is not established;

the fourth state changes to the fifth state when the condition $y_1<y$ in the right end of the screen is established, the fourth state changes to the second state when the condition $y_1\geqq y$ in the right end of the screen is established, and the fourth state remains when both conditions are not established; and the fifth state changes to the first state when the condition in the lower end of the screen is established, and the fifth state remains when the condition is not established; thereby determining the third state is in the small region and other states except the third state are out of the rectangular region.

3. The image processing method according to claim 1:

wherein said rectangular region includes first and second small regions and a large region in the screen, in the manner that a coordinate in the upper left corner of a first rectangular region is ($x_O$, $y_O$), and a coordinate in lower right corner is ($x_1$, $y_1$), a coordinate in the upper left corner of a second rectangular region is ($x_2$, $y_2$), and a coordinate in lower right corner is ($x_3$, $y_4$), first and second hypothetical straight lines are extending to right and left from the upper side of the first rectangular region 51, third and fourth hypothetical straight lines are extending to right and left from the lower side of the first region, fifth and sixth hypothetical straight line are extending to right and left from the upper side of the second rectangular region, and seventh and eighth hypothetical straight lines are extending to right and left from the lower side of the second region, in which said first through eighth straight lines divide the screen into nine regions:

wherein processing states are allotted to the divided nine regions, respectively, an allotment is performed in the manner that the first state $S_1$ is to an upper region of the upper side of the first rectangular region, the second state is to a left region of the first rectangular region, the third state is to an inside of the rectangular region, the fourth state is to a right region of the first rectangular region, the fifth state $S_5$ is to the lower region of the first rectangular region, respectively, the sixth state is allotted to a left region of the second rectangular region, the seventh state is to an inside of the rectangular region, the eighth state is to a right region of the second rectangular region, and the ninth state is to a lower region of the second rectangular region, respectively;

and wherein a state transition is now performed as being an initial state of the first state in the manner that the first state changes to the second state when the condition $y_O<y$ is established, and the first state remains when the condition is not established;

the second state changes to the sixth state when the condition $x>x_O$ is established, and the second state remains when the condition is not established;

the third state changes to the fourth state when the condition $x>x_1$ is established, and the third state remains when the condition is not established;

the fourth state changes to the second state when the condition $y_1 \geqq y$ in the right end of the screen, the state $S_4$ changes to the state $S_5$ when the condition $y_1<y$ is established in the right end of the screen, and the state $S_4$ remains when both conditions are not established;

the fifth state changes to the sixth state when the condition $y_2<y$ is established, and the fifth state remains when the condition is not established;

the sixth state changes to the seventh state when the condition $x>x_2$ is established, and the sixth state remains when the condition is not established;

the seventh state changes to the eighth state when the condition $x>x_3$ is established, and the seventh state remains when the condition is not established;

the eighth state changes to the sixth state when the condition $y_3 \geqq y$ in the right end of the screen, the eighth state changes to the ninth state when the condition $y_3<y$ is established in the right end of the screen, and the eighth state remains when both conditions are not established; and the ninth state changes to the first state when the position is in a lower end of the screen, and the ninth state remains when the condition is not established, thereby determining the third state being an inside of the first rectangular region and determining the seventh state being an inside of the second rectangular region, thereby further determining other states to be an outside of the first and second rectangular regions.

4. The image processing method according to claim 1:

wherein said screen includes a small window which is inserted into a large window on the screen as duplicated first and second rectangular regions, and the second rectangular region is included in the first rectangular region, a coordinate of the upper left corner of the first rectangular region is set to be $(x_0, y_0)$, and a coordinate of the lower right corner is to be $(x_1, y_1)$, a coordinate of the upper left corner of the second rectangular region 52 is set to be $(x_2, y_2)$, and a coordinate of the lower right corner is to be $(x_3, y_3)$;

wherein first and second hypothetical straight lines are extending to right and left from the upper side of the first rectangular region, third and fourth hypothetical straight lines are extending to right and left from the lower side of the region, fifth and sixth hypothetical straight line are extending to right and left from the upper side of the second rectangular region, and seventh and eighth hypothetical straight lines are extending to right and left from the lower side of the second region 52, in which said first through eighth straight lines divide the screen into thirteen regions allotting processing states into said divided thirteenth regions, respectively; and thereby determining the third, sixth–ninth, and eleventh states to be in the first rectangular region, and the seventh state to be in the second rectangular region.

5. An image processing system for displaying different images on inside and outside of a window which is opened at an arbitrary portion on a screen, comprising:

first present address generating means on a main scanning side for generating a present position along a main scanning direction;

second present address generating means on a sub scanning side for generating a present position along a sub scanning direction;

connecting means for generating the present addresses on both sides of said main scanning side and said sub scanning side;

start and end addresses generating means for respectively generating start addresses and end addresses on both sides of the main scanning and sub scanning directions, respectively;

comparison means for comparing the present address on both sides of the main scanning and sub scanning directions with the start addresses and the end addresses on both sides of the main scanning and sub scanning directions; and sequencer means for sequentially processing an image signal in the manner of forming a rectangular region on a screen;

wherein said comparison means generates the present addresses on both of the main and sub directions by comparing only one address of the main and sub directions with the start or end address at the same time.

6. The image processing system according to claim 5, wherein said first present address generating means comprising:

a first register for sequentially storing first step data which are formed by a sequential increment for a desired step width in a scanning direction;

a first adder for adding two input data having at least as one input the first step data from the first register; and a second register for first storing an initial screen which is externally set on the basis of an added result from the first adder and for sequentially storing change components of a motion picture screen in the scanning direction by sequentially renewing the initial screen to output them.

7. The image processing system according to claim 6, wherein said second present address generating means comprising:

a third register for sequentially storing second step data which are formed by a sequential increment for a desired step width in an orthogonal direction of the scanning direction;

a second adder for adding two input data having at least as one input the second step data from the third register; and a fourth register for first storing an initial screen which is externally set on the basis of an added result from the second adder and for sequentially storing change components of the motion picture screen in the orthogonal direction of the scanning direction by sequentially renewing the initial screen to output motion image signals.

8. The image processing system according to claim 7, wherein said connecting means comprises a node for supplying both outputs of the second and fourth registers;

wherein said start and end addresses generating means comprises a window screen setting registers group including first and second address signal generators which generate address signals of starting and ending positions of the window in the scanning direction, respectively, and third and fourth address signal generators which generate address signals of starting and ending positions of the window in the orthogonal direction of the scanning direction;

wherein said comparison means comprises a comparator for comparing an output of the node with an output from the window screen setting resisters group; and wherein said sequencer means comprises a sequencer for supplying an output of a comparison result of the comparator to the window screen setting registers group and for sequentially outputting a window set signal on the basis of the registers group.

* * * * *